(No Model.)
A. W. THOMAS.
RIM AND TIRE FOR WHEELS.
No. 399,359.  Patented Mar. 12, 1889.
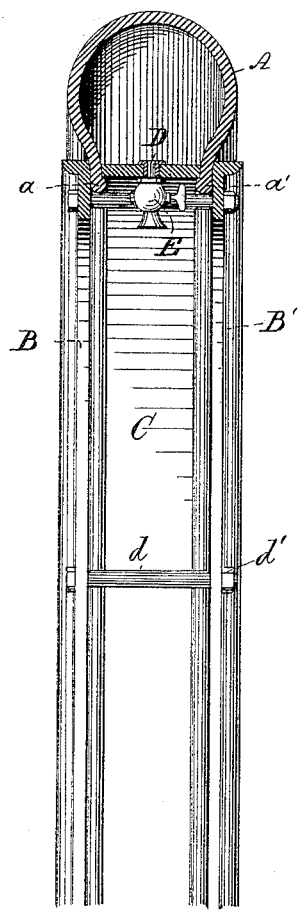
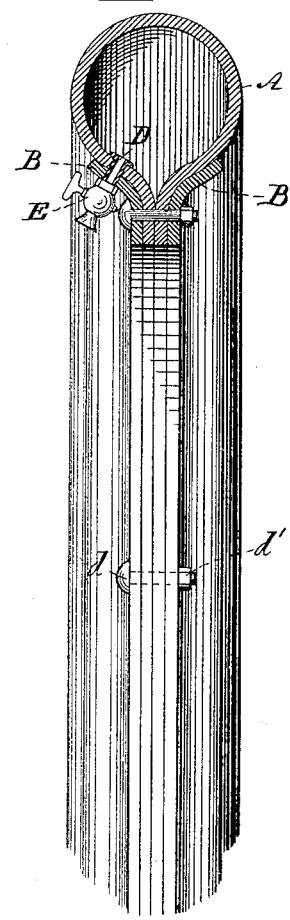
WITNESSES:
Hermann Bornmann
W. A. Whitmore
INVENTOR:
Amos W. Thomas
By J. Walter Douglass
ATT'Y.

UNITED STATES PATENT OFFICE.

AMOS W. THOMAS, OF PHILADELPHIA, PENNSYLVANIA.

RIM AND TIRE FOR WHEELS.

SPECIFICATION forming part of Letters Patent No. 399,359, dated March 12, 1889.

Application filed June 30, 1888. Serial No. 278,644. (No model.)

*To all whom it may concern:*

Be it known that I, AMOS W. THOMAS, a citizen of the United States, residing at the city of Philadelphia, in the county of Philadelphia, in the State of Pennsylvania, have invented certain new and useful Improvements in Tires and Fellies for the Wheels of Vehicles, of which the following is a specification.

My invention relates to a class of tires composed of flexible or elastic material as opposed to those made of metal and such as may be readily inflated by air, gas, water, or other liquids or fluids for use in connection with improved two-part fellies.

The invention is especially applicable to the road-wheels of bicycles, tricycles, and velocipedes of all varieties, yet nevertheless equally applicable to the road-wheels of carriages, wagons, and other rolling conveyances.

The principal object of my present invention is to provide an inflatable tire made from a sheet of flexible material and such as may be caused to assume a tubular or substantially cylindrical form when brought into engagement with a two-part felly of any suitable shape or form, and provided with means whereby the flexible tire may be securely held to place between said felly, thereby producing a strong, durable, and serviceable tire for various uses.

The characteristic features of my invention will be more fully understood by reference to the accompanying drawings, forming part hereof, in which—

Figure 1 is a transverse sectional view of a tire embodying the features of my invention as applied to a two-part felly of a type capable of being used in connection with the road-wheels of a bicycle, tricycle, or other rolling conveyance, the felly being shown partly in section and partly in elevation; and Fig. 2 is a similar view of a modified form of an inflatable hollow flexible tire and a modified form of felly embodying the features of my present invention.

Referring to the drawings for a further description of my invention, A is the tire, made from a sheet of flexible material impervious to liquids or fluids and caused to assume an endless tubular or U form. When constructed in the form of the letter U, the sides near the outer extremities, and designated by the letters $a$ and $a'$, are thickened so as to form enlargements thereat, for a purpose to be presently more fully explained.

B and B' are two flanged rings, made of metal, wood, or other suitable material, and forming the felly proper of the wheel.

C is an annular rim, which is interposed between the tire and the two-part felly B and B', and these parts are combined and held firmly in position by means of bolts $d$ and nuts $d'$.

The rim C, being located above the enlargements $a$ and $a'$ of the tire A, in order that the tire, when bent into a cylindrical form or approximately the form of the letter U, may be held snugly and tightly up against the inner walls of the flanged rings B and B', constituting the two-part felly, by means of bolts $d$ and nuts $d'$, as shown in Fig. 1.

The tire A may, if desired, be held more solidly in its normal position by cementing the same to the rim or plate C and the rings B and B' in any preferred manner, and thereby not only holding said tire solidly in position, but in a most satisfactory manner guarding against leakage of the inflating medium from the tire A. In the wall of the rim or plate C is introduced one or more tubes, D, provided with stop-cocks E for the introduction of air, gas, water, or other aeriform or gaseous fluids or liquids for the inflation of the tire, and of causing the same to retain its cylindrical contour or approximately U form. The degree of compressibility of the tire may be regulated by the amount of inflation, or by the tension of the inflating medium, which may be introduced under pressure.

I do not wish to be understood as limiting myself to the use of rubber for the formation of the tires, as leather woven or textile fabric suitably filled or treated to render it impervious to liquids or fluids may be used advantageously; but I give preference to the use of rubber, owing to its particular adaptability for the purpose and from the standpoint of economy.

In Fig. 2 I have shown a modified form of my invention, and in which A is the tire, made of a sheet of flexible or elastic material of any desired length bent into a cylindrical form with the meeting extremities thereof suitably secured together by, for example, cementation, riveting, or stitching the two parts together, or in any other preferred manner.

B and B′ are two curved or angular plates or rings constituting the felly, between which the tire A is caused to engage, and which is held firmly between said part by means of bolts $d$ and nuts $d'$. Into one of the annular plates or rings B or B′ is inserted a tube, D, provided with a stop-cock, E, for the introduction of air, gas, water, or other liquids or fluids for inflating the flexible tire A, and causing it to assume and retain for an indefinite period a cylindriform contour.

The particular advantages incident to the use of such tires as hereinbefore described, in addition to being exceptionally strong and durable, are that they are capable of withstanding most satisfactorily friction, abrasion, and rough usage, to which such tires are subject especially in their application to the road-wheels of bicycles, tricycles, or velocipedes of the different varieties.

Having thus described the nature and objects of my invention, what I claim as new, and desire to secure by Letters Patent, is—

1. A hollow flexible tire, in combination with a two-part felly, means, substantially as described, for clamping the tire to said felly, and a device for inflating said tire, substantially as and for the purposes set forth.

2. An inflatable tire, in combination with a two-part felly, a rim; and means for clamping said rim, tire, and felly together, substantially as shown and described.

3. A hollow flexible tire having the edges thereof firmly held together, in combination with a two-part felly, means for holding said tire between said felly, and a tube provided with a stop-cock in said felly or tire, or both, for permitting of the inflation of said tire, substantially as described.

4. An inflatable flexible tire having the edges thereof firmly held together, in combination with a two-part felly and means for clamping said tire firmly between said felly, substantially as and for the purposes set forth.

In witness whereof I have hereunto set my signature in the presence of two subscribing witnesses.

AMOS W. THOMAS.

Witnesses:
W. A. WHITMORE,
GEO. W. REED.